United States Patent
Nonaka

[11] Patent Number: 5,329,907
[45] Date of Patent: Jul. 19, 1994

[54] FUEL INJECTION CONTROL DEVICE FOR TWO STROKE COMBUSTION ENGINE

[75] Inventor: Kimihiro Nonaka, Iwata, Japan

[73] Assignee: Yamaha Hatsudoki Kabushiki Kaisha, Iwata, Japan

[21] Appl. No.: 73,740

[22] Filed: Jun. 8, 1993

[30] Foreign Application Priority Data

Jun. 26, 1992 [JP] Japan .................. 4-191393

[51] Int. Cl.⁵ .................. F02D 41/34; F02D 41/36
[52] U.S. Cl. .................. 123/478; 123/676
[58] Field of Search .................. 123/73 C, 478, 480, 123/486, 436, 676

[56] References Cited

U.S. PATENT DOCUMENTS

| | | | |
|---|---|---|---|
| 4,509,485 | 4/1985 | Hasegawa | 123/676 |
| 4,683,857 | 8/1987 | Yasuoka | 123/676 |
| 4,823,755 | 4/1989 | Hirose et al. | 123/486 |
| 4,936,277 | 6/1990 | Deutsch et al. | 123/436 |
| 4,957,089 | 9/1990 | Morikawa | 123/73 C |
| 5,051,909 | 9/1991 | Gomez et al. | 123/73 C |
| 5,056,487 | 10/1991 | Yamakado et al. | 123/436 |
| 5,131,371 | 7/1992 | Wahl et al. | 123/676 |
| 5,134,984 | 8/1992 | Nonaka et al. | 123/73 C |
| 5,215,068 | 6/1993 | Kato | 123/676 |
| 5,259,344 | 11/1993 | Huang et al. | 123/73 C |

FOREIGN PATENT DOCUMENTS 3199667  8/1991  Japan .

Primary Examiner—Andrew M. Dolinar
Assistant Examiner—Thomas N. Moulis
Attorney, Agent, or Firm—Knobbe, Martens, Olson & Bear

[57] ABSTRACT

A fuel injection system for a multiple cylinder engine having plural cylinders communicating with the same exhaust pipe so that exhaust pulses from one cylinder will be reflected back to the exhaust ports of other cylinders of the same bank. In accordance with the invention, the timing and duration of fuel injection to the cylinders is varied so as to compensate for the effects of the reflected exhaust gas pulses so as to provide substantially equal emission control and power from all cylinders.

24 Claims, 6 Drawing Sheets

FUEL INJECTION CONTROL DEVICE FOR TWO STROKE COMBUSTION ENGINE

BACKGROUND OF THE INVENTION

This invention relates to a fuel injection control device and method for an engine and particularly for a two stroke crankcase compression type of engine.

As is well known, it is the practice to control the individual cylinders of a multi-cylinder engine so that they will operate in substantially the same fashion. As a result of this, both the spark timing and fuel injection timing and duration for each cylinder is set substantially the same and the events for each cylinder are timed in relation to their respective firing order. However, there are running conditions of the engine when the individual cylinders cannot be treated identically to each other.

For example, when the cylinders of a group of cylinders all discharge into a common exhaust system, the exhaust pulses from one cylinder can cause a pressure in the exhaust port of another cylinder that can affect the charging of that other cylinder. Thus, if all cylinders are treated the same, then one cylinder may have performance that is deteriorated from that of another cylinder. Unequal performance between the cylinders gives rise to a substantial loss of performance not only of the one cylinder but of the entire engine.

This problem is particularly acute with two cycle crankcase compression internal combustion engines that have a plurality of cylinders discharging into the same exhaust pipe. As is well known, the exhaust gas pulses from one cylinder can force charge back into another cylinder whose exhaust port is open at the same time so as to increase the residual exhaust gases in that other cylinder. This phenomenon is utilized sometimes to achieve an effect known as "exhaust supercharging". This condition is particularly acute in outboard motor application wherein the length of the exhaust system is substantially restricted due to the compact nature of such devices.

It is, therefore, a principal object of this invention to provide an improved fuel injection system and control therefor for an engine that will insure comparable performance of each cylinder.

It is a further object of this invention to provide a fuel injection system and control for a two cycle crankcase compression engine.

It is a further object on this invention to provide an improved fuel injection system and control method for an outboard motor.

SUMMARY OF THE INVENTION

This invention is adapted to be embodied in a fuel injection system and control therefor for an engine having at least two cylinders. Each cylinder has exhaust port means for discharging the exhaust gases from the cylinders that communicate with an exhaust pipe at different locations from its ends so that exhaust pulses from one of the cylinders may generate an exhaust pulse back to the exhaust port of the other cylinder. A pair of fuel injectors are provided for supplying fuel to respective cylinders of the engine.

In accordance with a system incorporating this invention, the operation of the fuel injectors is controlled to provide a difference in the fuel injected to one cylinder from the other so as to compensate for the effect of the exhaust gas pulses.

In accordance with a method of practicing the invention, the fuel provided to one of the cylinders by its fuel injector is adjusted relative to the fuel supplied to the other cylinder by its fuel injector so as to compensate for the differences in the effect of the exhaust gas pulsations between the cylinders.

DETAILED DESCRIPTION OF THE PREFERRED EMBODIMENTS OF THE INVENTION

Figure 1:
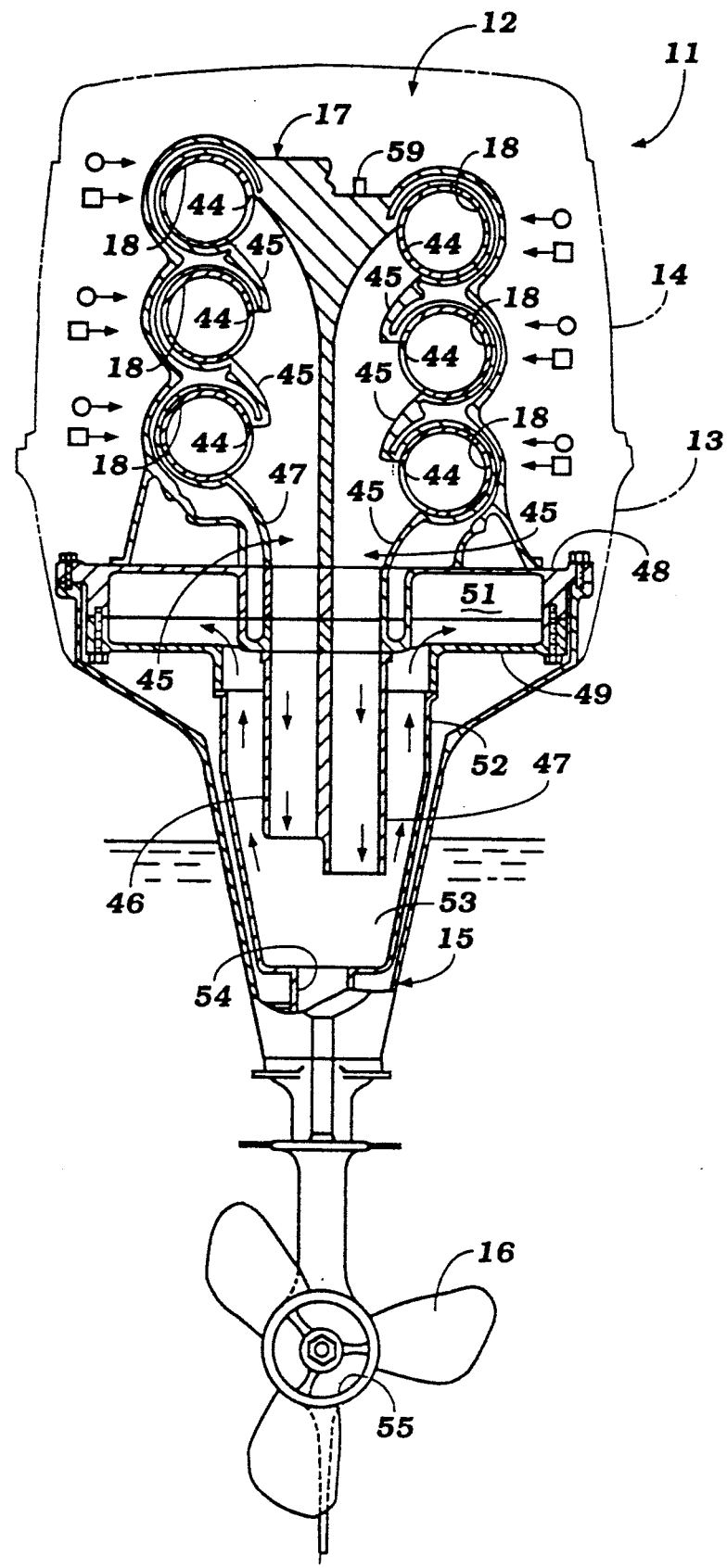
FIG. 1 is an enlarged rear elevational view of the outboard motor with a portion broken away and shown in section so as to illustrate the exhaust system for the engine.
Figure 2:
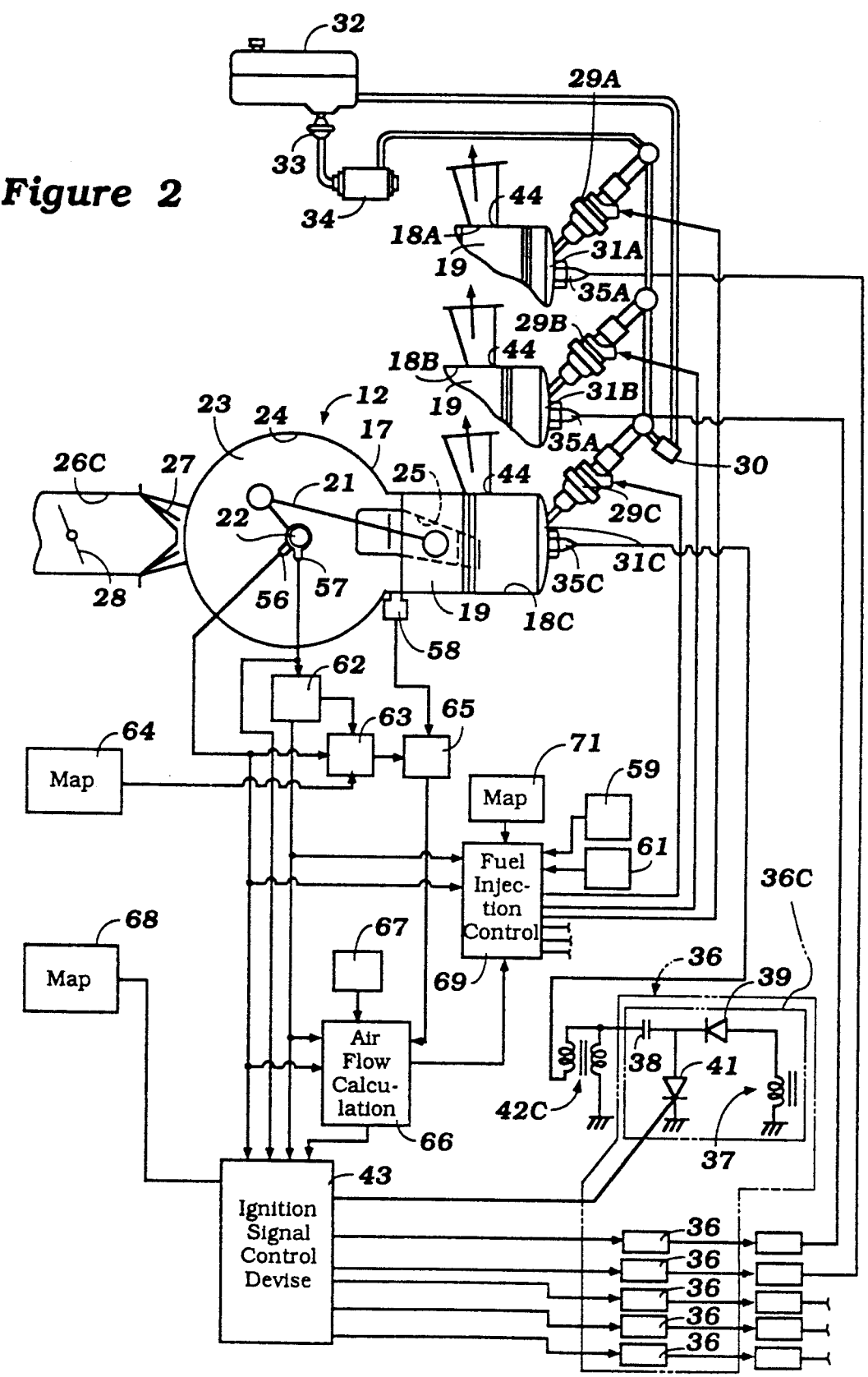
FIG. 2 is a partially schematic view of an outboard motor constructed in accordance with an embodiment of the invention showing the control system for the fuel injection and spark ignition system of the engine.

Referring now in detail to the drawings and initially primarily to FIGS. 1 and 2, an outboard motor constructed in accordance with an embodiment of the invention is identified generally by the reference numeral 11. The invention deals primarily with the powering internal combustion engine of the outboard motor 11 and for that reason the description of the outboard motor 11 will be relatively general and any details of the outboard motor 11 per se which are not described can be considered to be conventional. Although the invention has utility in other applications than outboard motors, it has particular utility in outboard motors due to the fact that there is a relatively small area for exhaust gas treatment.

The outboard motor 11 is comprised of a power head consisting of an internal combustion engine 12, some details of which also appear in FIG. 2, and a surrounding protective cowling, shown partially in phantom in FIG. 1 and comprised of a lower tray portion 13 and a removable upper main cowling portion 14.

A driveshaft housing and lower unit 15 depends from the tray 13 and the lower unit thereof contains a forward neutral reverse transmission driven by the output shaft of the engine 12 in a known manner for driving a propeller 16 and selected forward and reverse directions.

The engine 12 is of the V-6 type and operates on the two stroke crankcase compression principal. As will become apparent, the invention can be employed in conjunction with engines having other numbers of cylinders and, in fact, with engines having rotary rather than reciprocating action. However, the invention has particular utility where plural chambers of the engine have their exhaust ports communicating with each other through the exhaust system.

The engine 12 includes a cylinder block 17, which is shown schematically in FIG. 2, and which has a plurality of cylinder bores 18A, 18B, 18C aligned in one bank and a plurality of cylinder bores 18D, 18E and 18F aligned in another bank. These cylinder bores 18A through 18F are formed by liners that are pressed into the cylinder block in a well known manner. Pistons 19A, 19B, 19C, 19D, 19E and 19F are supported for reciprocation in each of the cylinder bores 18A through 18F. The pistons are connected by means of connecting rods 21 to a crankshaft 22 which is journaled for roation about a vertically extending axis within a crankcase formed by the skirt of the cylinder block 17 and a crankcase member 23 that is affixed to the cylinder block 17 in a well known manner. As is common practice with V-type engines, the cylinder bores 18A, 18B and 18C of one bank are slightly staggered from the cylinder bores 18D, 18E and 18F of the other bank as clearly shown in FIG. 1 so that the corresponding cylinders of the first bank are slightly higher than the corresponding cylinders of the second bank.

The crankcase member 23 and skirt of the cylinder block 17 form a plurality of respective crankcase chambers, one of which is indicated at 24C in FIG. 2 each of which communicates with a respective one of the cylinder bores 18A through 18F through respective scavenge passages, only one of which appears in the drawings and is identified by the reference numeral 25C, this being the scavenge passage associated with the cylinder bore 18C. As is well known, the scavenge passages 25 communicate the crankcase chambers 24 with the cylinder bores 18 as the pistons 19 reciprocate.

As aforenoted, the crankshaft 22 drives a driveshaft (not shown) that is rotatably journaled within the driveshaft housing 15 and which drives the forward neutral reverse transmission in the lower unit. This provides the final drive to the propeller 16 in a manner well known in this art.

An air charge is delivered to the crankcase chambers 24A through 24F from an induction system that includes an induction manifold having individual runners 26A through 26F which serve the respective crankcase chambers 24A through 24F. Reed type check valves 27A through 27F are disposed in each runner 26A through 26F for permitting the air charge to enter the respective crankcase chamber 24 but for precluding reverse flow when the charge is being compressed due to downward movement of the respective piston 19. Respective throttle valves 28A through 28F are positioned in each manifold runner 26A through 26F for controlling the speed of the engine in a well known manner. An air intake device including a silencer (not shown) is positioned with the protective cowling 13, 14 for admitting an air charge to the manifold runners 26.

As has been noted, the induction system for the engine 12 introduces only a pure air charge into the individual crankcase chambers 24. It is to be understood that fuel injectors may be provided in the manifold runners 26 for supplying a fuel/air charge or carburetors may be employed for supplying a fuel/air charge to the crankcase chambers 24. However, in the illustrated embodiments of the invention, the engine 12 is provided with direct cylinder fuel injection provided by individual fuel injectors 29A through 29F. Each fuel injector 28A through 29F is electrically operated and has a solenoid for opening and closing an injection valve so as to permit fuel to be sprayed into a respective combustion chamber 31A through 31F formed by each of the cylinder bores 18A through 18F, pistons 19A through 19F and a cylinder head (not shown) affixed to each cylinder bank.

Fuel is supplied to the fuel injectors 29 from a remotely positioned fuel tank 32 by a conduit system including an inline filter 33 and high pressure pump 34. In addition, a fuel pressure regulator 30 is provided for controlling the pressure of fuel supplied to the individual fuel injectors by bypassing fuel back to the fuel tank 32 through a return line.

The charge which has thus been formed in the combustion chambers 31 is fired by respective spark plugs 35A through 35F each mounted in the respective cylinder head and having its gap projecting into the respective combustion chamber 31A through 31F. The spark plugs 35 are fired by an ignition circuit, indicated generally at 36 in FIG. 2. The ignition circuit 36 includes a plurality of individual firing circuits 36A through 36F with one of the circuits, that associated with the cylinder bore 18C, being shown in detail.

These firing circuits are of the SCR type and include a charging coil 37 of a flywheel magneto of the engine 12 which charges a charging capacitor 38 through a diode 39. An SCR 41 is provided for selectively discharging the capacitor 38 and inducing a high voltage in a respective spark coil 42A through 42F associated with each of the spark plugs 35A through 35F for firing the spark plugs in a well known manner in this art. The SCR's 41 of the individual ignition control circuits 36A through 36F are switched by an ignition signal control device, indicated generally by the reference numeral 43 and operating in a manner which will be described.

When the charge in the individual combustion chambers 31 is fired, it will burn and expand and drive the respective piston 19 downwardly so as to drive the crankshaft 22 in a well known manner. The burnt charge is discharged through a respective exhaust port 44A through 44F formed in the cylinders 18A through 18F. The exhaust ports 44A through 44F communicate with a pair of exhaust manifolds, indicated generally by the reference numerals 45 which are formed integrally in the cylinder block 17 in a side by side fashion. The exhaust manifolds 45 have individual runner sections 45A through 45F which communicate with the respective exhaust ports 44A through 44F and which form respective side by side collector sections into which the runners 45A through 45C and 45D through 45F communicate. Each manifold terminates in a respective exhaust pipe 46 and 47 which depend downwardly into the driveshaft housing 15.

It should be noted that the engine 17 is mounted on a spacer plate assembly that is comprised of an upper plate 48 and a lower plate 49 which are fixed to each other and which define an internal cavity 51 which forms in part an expansion chamber. The lower plate 49 is connected to a further inner shell 52 which depends into the driveshaft housing 15 and defines a further extension 53 of the expansion chamber with the portion 51 and into which the lower ends of the exhaust pipes 46 and 47 discharge. It should be noted that the lengths of the exhaust pipes 46 and 47 are the same so that they terminate at different vertical locations in the expansion chamber 51, 53 due to the aforenoted offset in the cylinder banks.

The exhaust gases are then discharged from the expansion chamber 51, 53 through a high speed exhaust gas discharge 54 formed at the lower end of the shell 52 and which communicates with a through the propeller hub high speed exhaust gas discharge opening 55. As is well known in this art, an above the water low speed exhaust gas discharge (not shown) is provided for discharging the exhaust gases from the expansion chamber 51, 53 when the associate watercraft is traveling at a low rate of speed and when the propeller discharge 55 is relatively deeply submerged.

A control system, now to be described, provides the necessary control for the firing of the spark plugs 35 and timing of injection and duration of the fuel injectors 29 in response to varying engine running conditions and also to compensate for cylinder to cylinder variations as will be noted. The control system for the fuel injectors 29 and spark plugs 35 includes a number of sensors which sense ambient conditions and engine running conditions. Although certain specific types of sensors will be described, it is to be understood that additional inputs of ambient and engine running conditions may be employed or other inputs may be substituted for those which are described. Such variations in the control parameters will be readily apparent to those skilled in the art.

The sensors include a basic crank angle detecting sensor 56, and pulser coil 57 that are mounted on the crankcase 25 in proximity to the crankshaft 22 and which indicate both the angular position of the crankshaft and its rotational speed. In addition, a crankcase pressure sensor 58 is provided in one or more of the crankcase chambers 24A through 24F for sensing the pressure in the crankcase chambers. It is well known that differences in crankcase pressure during a cycle are a very accurate indication of air flow to the engine.

Engine temperature is sensed by an engine temperature sensor 59 that is mounted in a suitable manner, preferably on the cylinder block 17 in proximity to the cooling jacket of the engine so as to provide an indication of actual engine temperature. Also, there is provided a shift position detector 61 which will sense the condition of the transmission, aforedescribed in the lower unit which drives the propeller 16. The shift condition sensor 61 in this embodiment provides an output signal indicative of when the transmission is in a neutral condition.

It has already been noted that the firing of the spark plugs is controlled by the spark control circuit 36 which is, in turn, controlled by the ignition signal control device 43. The ignition signal control device receives signals which are indicative both of engine speed, crankshaft rotational angle and air flow. The pulser coil 57 outputs its signal to an engine speed detector circuit 62 which counts the pulses in a given time period and provides a signal of engine speed to the ignition control device 43. In a same manner, the crank angle position detector 56 outputs a signal indicative of crank angle to the ignition signal control device 43.

The engine speed detector 62 also outputs a signal to a convertor 63 which receives also the crank angle signal from the sensor 56 and which determines from a map or memory 64 the relationship between engine speed and crank angle so as to control the outputs of the pressure sensor 58 through a control 65 so as to feed the crankcase pressure signals at the appropriate times to an air flow calculator 66 which also has a map or memory 67 so as to provide an output signal to the ignition signal control device 43 indicative of the amount of air flowing to the engine. The ignition control device 43 then processes these signals and compares them with a map contained in a memory 68 so as to calculate the appropriate engine timing for firing of the spark plugs 35 and thus controlling the SCR's 41 in the aforedescribed manner so as to fire the spark plugs 35 at the appropriate crank angle.

Figure 4:
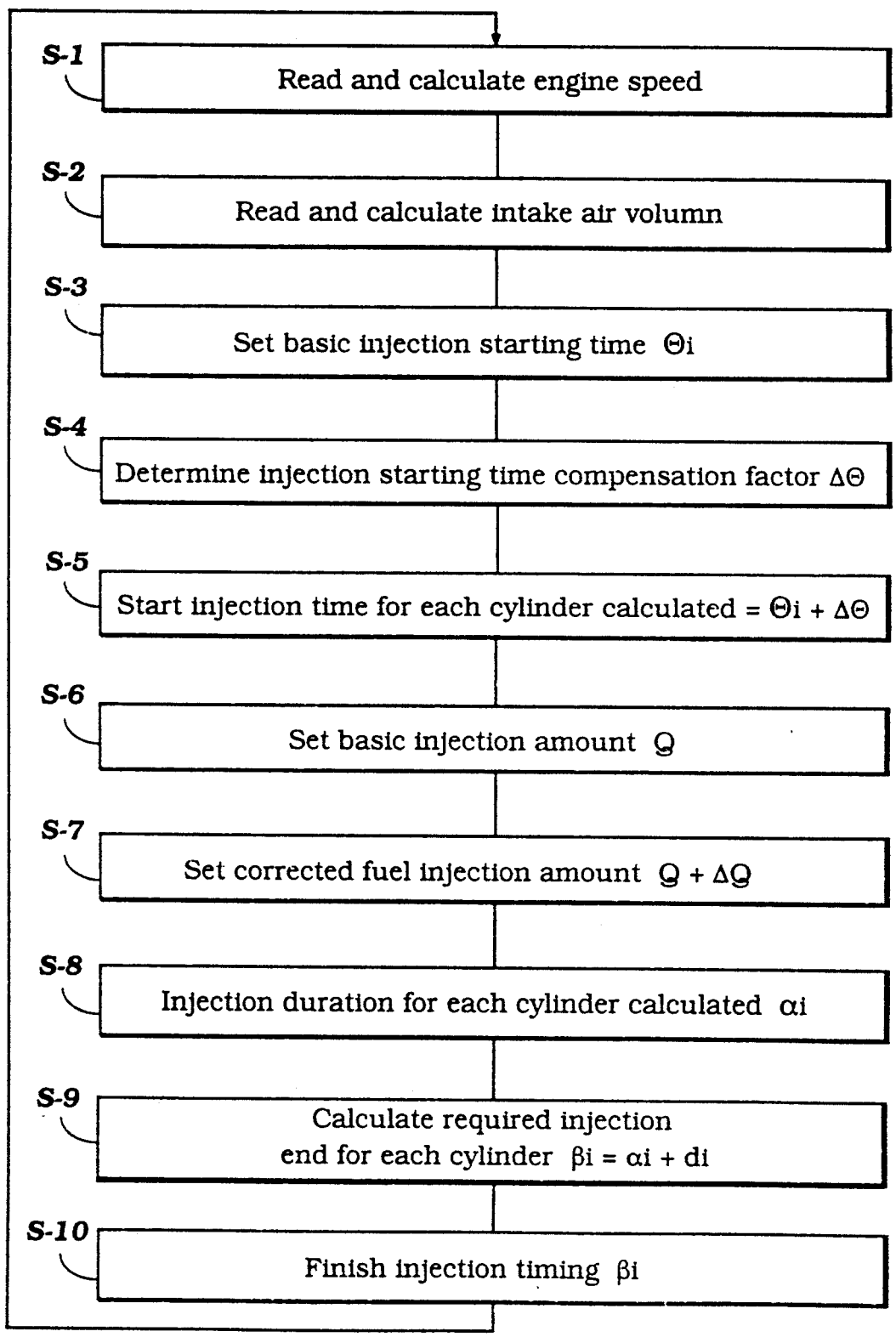
FIG. 4 is a block diagram showing the control routine for the injection system.

The duration and timing of the fuel injectors 29 is controlled by a fuel injection control, indicated schematically at 69 which receives signals from both the crankshaft position detector 56 and engine speed from the engine speed detector 62 as well as the air flow signal from the air flow calculator 66. In addition, the fuel injection control 69 also receives the engine temperature signal from the engine temperature sensor 59 and a signal from the shift position detector 61. Furthermore, an additional map or memory 71 is provided which permits the fuel injection control 69 to select the appropriate timing and duration of fuel injection for each cylinder or for groups of cylinders. In addition to selecting the amount of fuel injection for normal running conditions, the fuel injection control also controls the amount of fuel injected to the cylinders so as to provide good exhaust emission control and the control routine for this is illustrated in FIG. 4 and will later be described by particular reference to that figure.

The control system compensates for the amount and duration of fuel injection to each cylinder of each bank so as to provide substantially equal power outputs and better exhaust emission control. This is necessary because of the fact that the cylinders of the first bank containing the cylinders bores 18A, 18B and 18C are each spaced at different ends from their respective end of the exhaust pipe 46 as are the cylinders 18D, 18E and 18F of the other bank which cooperate with the exhaust pipe 47.

The firing order is such that each cylinder of each bank fires from top to bottom. That is the cylinder firing order of the one bank is 18A, 18B and 18C while the cylinders of the other bank fire in the order 18D, 18E and 18F. As is well known, the firing of the cylinders alternate between the banks so that the total engine firing order is 18A, 18D, 18B, 18E, 18C and 18F.

Figure 3:
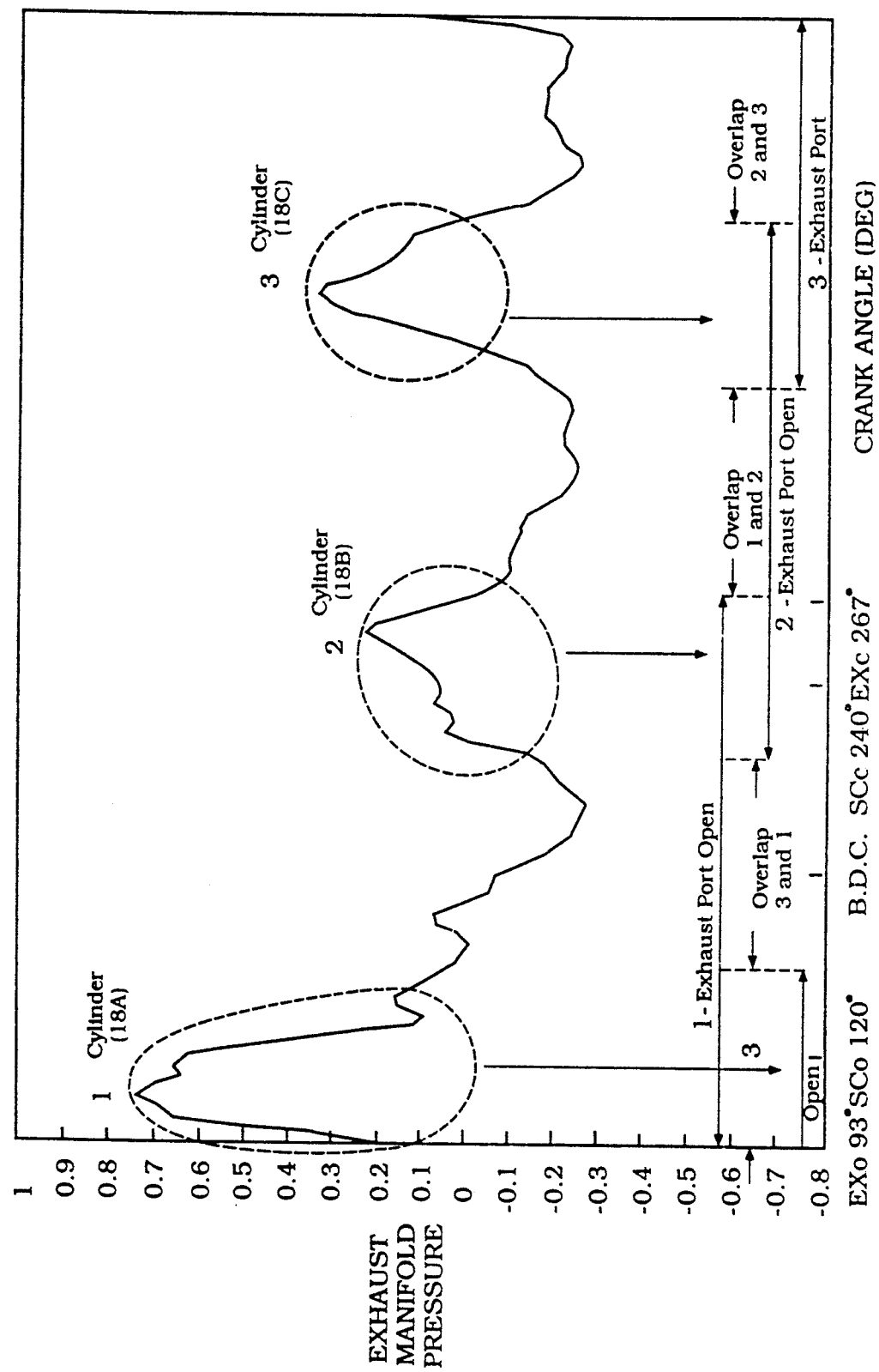
FIG. 3 is a graphical view showing the relationship of the exhaust pressure in the exhaust system relative to crank angle.

For the purposes of this description the effect of each bank may be considered independently and FIG. 3 is a graphical view showing the exhaust gas pressure in the exhaust manifolds 45 in response to crank angle. Pressure is expressed in terms of pressures per atmosphere above and below atmospheric pressure in this figure. It should be noted that cylinders indicated as 1, 2 and 3 in FIG. 3 correspond to cylinders 18A, 18B and 18C or 18D, 18E and 18F. The duration of scavenge port opening for each cylinder is indicated by the respective horizontal lines in FIG. 3.

As may been from FIG. 3, the exhaust manifold pressure is higher on the average when the cylinder number 1 (18A) is exhausting than with cylinders numbers 2 and 3 (18B and 18C). This is primarily due to the fact that the first cylinder is further from the end of the exhaust pipe 46 than the other two cylinders. Because of these pressure differences, the scavenging of one cylinder will differ from each other as will the power developed by each other. As a result of this, if there is not some adjustment made in cylinder to cylinder variation, then the performance of the engine can deteriorate both in the terms of power output and also in the terms of effectiveness of cylinder scavenging. The similar situation occurs between the cylinders of the other bank (18D, 18E and 18F) which are numbered as cylinders 4, 5 and 6, respectively, in the later figures which show the actual correction factor employed in the fuel injection system.

In order to compensate for these pressure differences and differences in effective scavenging, the timing and duration of fuel injection for one or more cylinders is set differently from the others although there is a basic initial fuel injection timing and duration set for each cylinder which is the same in relation to the crank angle for that particular cylinder in relation to that cylinders top and bottom dead center positions. These correction angles are preprogrammed into the maps as previously described and particularly the map 71 for the fuel injection control.

The method by which the fuel injection control 69 adjusts the fuel injection for the individual cylinders will now be described by particular reference to the control routine of FIG. 4. It should be noted that FIG. 4 only shows the portion of the control routine dealing with the adjustments of injection timing and that the other controls may be established in accordance with any desired type of control routine. At the Step S-1 the engine speed is read and calculated with the reading taken by the pulser coil 57 and calculated at the speed detector circuit 62 in the manner as aforedescribed.

At the Step S-2 the intake air volume is then read and calculated. This is done by reading the pressures in the crankcase chambers 23 at a time approximately equal to scavenge port opening and scavenge port closing by the pressure sensor 58 and then transmitting these readings to the air flow calculator 66 which then provides an indication of the amount of air flow. The engine speed and intake air volume provide the speed and load figures that permit the fuel injection control 69 to read from the map 71 the timing of fuel injection in relation to a basic crank angle and to calculate the amount of fuel required for the running conditions.

The program then moves to the Step S-3 so as to set the basic injection starting time $\beta_i$ for each cylinder. The program then moves to the Step S-4 so as to determine the injection starting time compensation factor $\Delta\theta$ for each cylinder and this is done by reference to a map of the type shown in FIG. 5.

Figure 5:
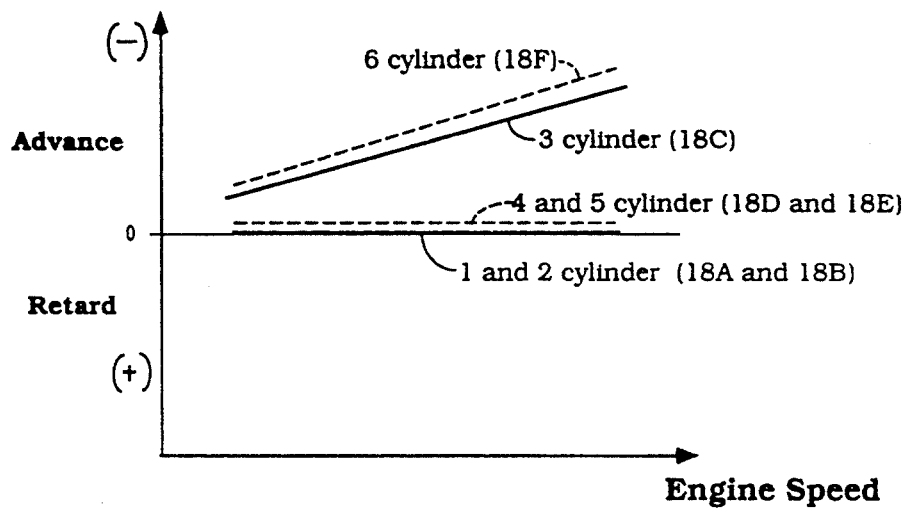
FIG. 5 is a graphical view showing the relationship of the fuel injection starting time compensation amount for individual cylinders in relation to engine speed.

FIG. 5 shows the injection starting time compensation amount for each cylinder in relation to engine speed. It should be noted that the first and second cylinders (18A and 18B) require no compensation for the reason that these cylinders injection starting times can be approximately equal due to the overlap conditions. However, the condition for the third cylinder is such that it is desirable to advance injection timing as the engine speed increases and this graph reflects this. For the cylinders of the other bank, the correction factors are approximately the same but are offset slightly due to the fact that these cylinders are disposed slightly lower than the cylinders of the first bank.

The program then moves to the Step S-5 so as to calculate the exact injection starting time for each cylinder in accordance with the formula $\theta_i + \Delta\theta$.

Having determined the injection starting time for each cylinder, the program then moves to the Step S-6 so as to determine the amount of fuel required for each cylinder which also will determine the finishing injection time. The amount of fuel standard for each cylinder is expressed as the amount $\theta$. This amount is determined again by the engine speed and intake air volume in accordance with any standard routine.

Figure 6:
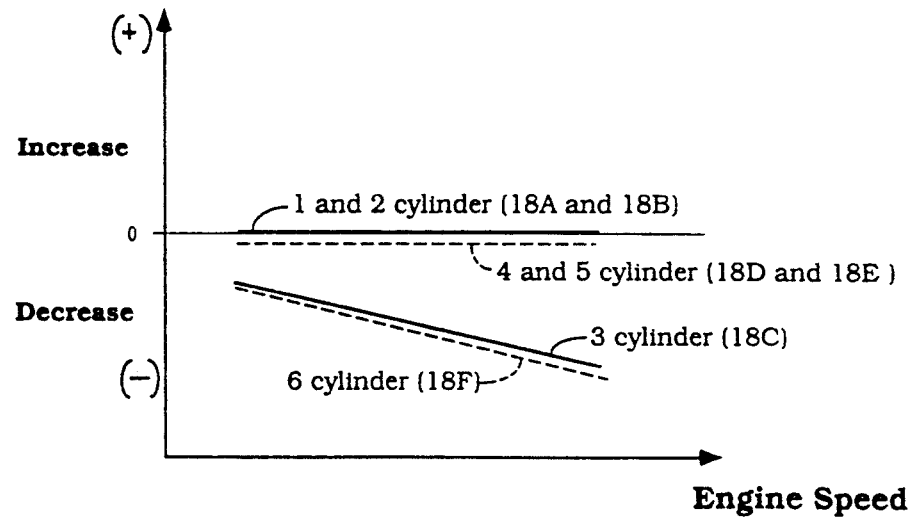
FIG. 6 is a graphical view showing the fuel injection volume compensation amount or duration of fuel injection compensation for each cylinder in response to variations in engine speed.

The program then moves to the Step S-7 so as to determine the corrected fuel injection amount by determining the cylinder to cylinder correction in accordance with a map of the type as shown in FIG. 6. Again, no correction is required in the amount for the first and second cylinders of the first bank (18A and 18B) and a small offset or decrease is required of the first and second cylinders of the second bank (4 and 5—18D and 18E). However, for the third cylinder of the first bank 18C a decrease in the amount of fuel supplied which, increases as the engine speed increases is required. This is also true for the six cylinder 18F which has a further fixed offset.

The program then moves to the Step S-8 so as to determine the duration of injection for each cylinder depending upon the amount of fuel required $a_i$. The program then moves to the Step S-9 so as to determine the actual injection timing termination for each cylinder using the corrective factor in accordance with the equation $B_i = a_i + d_i$. The program then moves to the Step S-10 so as to terminate the injection timing at the timing $B_i$ as calculated at the Step S-9.

Thus, it can be seen that the desired timing of starting injection and injection duration is calculated in response to predetermined information dependent upon the exhaust back pressure that will be present at each cylinder and, accordingly, the amount of residual exhaust gas which exists at each cylinder.

Figure 7:
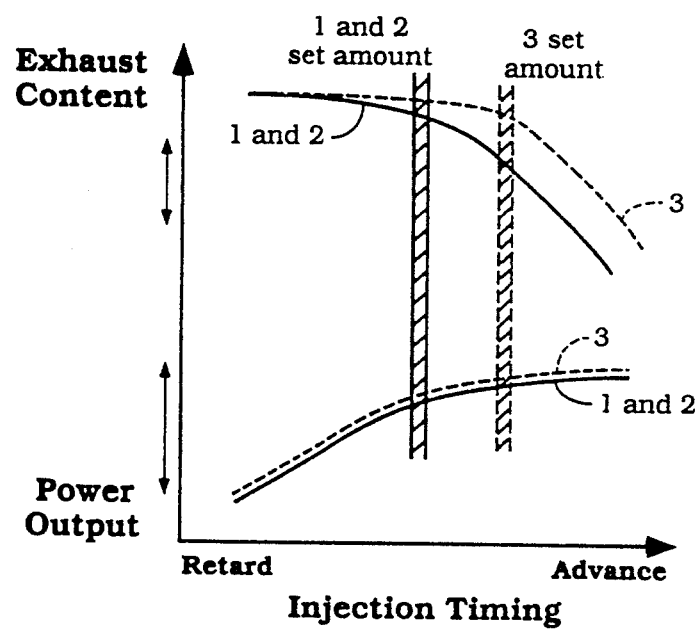
FIG. 7 is a graphical view showing the amount of undesirable exhaust gas constituents and power output in relation to injection timing for the individual cylinders and how the timing is set for those individual cylinders.

This is done in order to achieve a compromise as shown in FIG. 7 which shows the amount of unwanted exhaust gas constituents for cylinders 1 and 2 in the solid line curves and cylinder number 3 in the broken line curve. As with FIG. 3, the amount of offset for the cylinders for the other bank will be comparable. As may be seen, the exhaust gas curves for cylinders 1 and 2 have a different shape than that for cylinder 3 while the power output curves have a comparable shape but cylinder 3 will generate slightly higher power for a given condition than cylinders 1 and 2 due to the exhaust super charging effect aforedescribed. As a result, the injection timing for cylinders 1 and 2 are set by the solid shaded line curve so as to provide injection timing in a point when the exhaust gas content will not be falling off as rapidly but where the engine power output for these cylinders is not at its maximum. As to cylinder 3, the injection timing is set as by the shaded bar so as to provide the injection timing when the exhaust gas content will not begin to fall off but again before the power is at an optimum. In this way, the best performance for the engine as a whole can be easily determined and cylinder to cylinder variations can be compensated for. Of course, the foregoing description is that of a preferred embodiment and control routine and it should be apparent to those skilled in the art how variations may be made while still practicing the invention. Such variations are well within the spirit and scope of the invention, as defined by the appended claims.

What is claimed is:

1. A fuel injection system for an internal combustion engine having at least two cylinders, exhaust port means for discharging exhaust gases from each of said cylinders, an exhaust pipe having a pair of inlet ends each communicating with a respective one of said exhaust port means and a common outlet end for discharging the exhaust gases to the atmosphere so that exhaust pulses from one of said cylinders may generate an exhaust pulse back to the exhaust port of the other cylinder, a pair of fuel injectors each supplying fuel to a respective one of said cylinders, and means for controlling the operation of said fuel injectors to provide a difference in the fuel injection to each cylinder from the other for compensating for the transmission of exhaust pulses.

2. A fuel injection system as set forth in claim 1 wherein the cylinders are positioned vertically one above the other and the exhaust pipe extends in a vertical direction with its discharge end being disposed closer to one of the cylinders than the other of the cylinders.

3. A fuel injection system as set forth in claim 1 wherein the beginning of injection for one cylinder is varied in relation to the other.

4. A fuel injection system as set forth in claim 1 wherein the duration of fuel injection for one cylinder is varied one with respect to the other.

5. A fuel injection system as set forth in claim 4 wherein the beginning of injection is also varied in relation to one cylinder from the other.

6. A fuel injection system as set forth in claim 5 wherein the cylinders are positioned vertically one above the other and the exhaust pipe extends in a vertical direction with its discharge end being disposed closer to one of the cylinder than the other of the cylinders.

7. A fuel injection system as set forth in claim 1 wherein there are at least three cylinders each having exhaust port means served by a common exhaust pipe.

8. A fuel injection system as set forth in claim 7 wherein the fuel injection for two of the cylinders is maintained the same.

9. A fuel injection system as set forth in claim 8 wherein the cylinders are positioned vertically one above the other and the exhaust pipe extends in a vertical direction with its discharge end being disposed closer to one of the cylinder than the other of the cylinders.

10. A fuel injection system as set forth in claim 8 wherein the beginning of injection for one cylinder is varied in relation to the others.

11. A fuel injection system as set forth in claim 8 wherein the duration of fuel injection for one cylinder is varied with respect to the others.

12. A fuel injection system as set forth in claim 11 wherein the beginning of injection is also varied for one cylinder relative to others.

13. A method for controlling a fuel injection system for an internal combustion engine having at least two cylinders, exhaust port means for delivering exhaust gases from each of the cylinders, an exhaust pipe having a pair of inlet ends each communicating with a respective of the exhaust port means and a common outlet means so that exhaust pulses from one cylinder may generate an exhaust pulse back to the exhaust port of the other cylinder, and a pair of fuel injectors each supplying fuel to a respective cylinder of the engine, said method comprising the steps of controlling the operations of the fuel injection to provide a difference in the fuel injection to one cylinder from the other to compensate for the effect of exhaust gas pulses.

14. A method as set forth in claim 13 wherein the cylinders are positioned vertically one above the other and the exhaust pipe extends in a vertical direction with its discharge end being disposed closer to one of the cylinder than the other of the cylinders.

15. A method as set forth in 13 wherein the beginning of injection for one cylinder is varied in relation to the other.

16. A method as set forth in claim 13 wherein the duration of fuel injection for one cylinder is varied one with respect to the others.

17. A method as set forth in claim 16 wherein the beginning of injection is also varied for one cylinder relative to the others.

18. A method as set forth in claim 17 wherein the cylinders are positioned vertically one above the other and the exhaust pipe extends in a vertical direction with its discharge end being disposed closer to one of the cylinder than the other of the cylinders.

19. A method as set forth in claim 13 wherein there are at least three cylinders each having exhaust port means served by a common exhaust pipe.

20. A method as set forth in claim 19 wherein the fuel injection for two of the cylinders is maintained the same.

21. A method as set forth in claim 20 wherein the cylinders are positioned vertically one above the other and the exhaust pipe extends in a vertical direction with its discharge end being disposed closer to one of the cylinder than the other of the cylinders.

22. A method as set forth in claim 20 wherein the beginning of injection for one cylinder is varied in relation to the others.

23. A method as set forth in claim 20 wherein the duration of fuel injection for each cylinder is varied with respect to the others.

24. A method as set forth in claim 23 wherein the beginning of injection is also varied for one cylinder relative to the others.

* * * * *